(12) United States Patent
Trzaskos et al.

(10) Patent No.: US 12,097,425 B2
(45) Date of Patent: Sep. 24, 2024

(54) ADAPTABLE INPUT DEVICES

(71) Applicant: Microsoft Technology Licensing, LLC, Redmond, WA (US)

(72) Inventors: James A. Trzaskos, Kirkland, WA (US); Ryan Whitaker, Seattle, WA (US); Brian Claire, Seattle, WA (US); Casey Cook Zelig, Lynnwood, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 282 days.

(21) Appl. No.: 17/846,277

(22) Filed: Jun. 22, 2022

(65) Prior Publication Data
US 2023/0415031 A1    Dec. 28, 2023

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09); *A63F 2300/1043* (2013.01)

(58) Field of Classification Search
CPC ... A63F 13/24; A63F 13/98; A63F 2300/1043
USPC .......................................................... 463/36
See application file for complete search history.

(56) References Cited

U.S. PATENT DOCUMENTS

| | | | |
|---|---|---|---|
| 5,551,693 A * | 9/1996 | Goto ..................... | H01H 9/0214 345/169 |
| 5,716,274 A * | 2/1998 | Goto ..................... | H01H 9/0214 345/169 |
| 5,853,326 A * | 12/1998 | Goto ..................... | A63F 13/24 345/169 |
| 11,437,841 B2 * | 9/2022 | Gonzalez ............... | H02J 50/10 |
| 2013/0267322 A1 | 10/2013 | South | |
| 2019/0379231 A1 * | 12/2019 | Gonzalez ............... | A63F 13/98 |
| 2021/0275907 A1 | 9/2021 | Khaira et al. | |

FOREIGN PATENT DOCUMENTS

| | | |
|---|---|---|
| CN | 109999484 A | 7/2019 |
| EP | 3224691 B1 | 4/2018 |
| EP | 3348315 A1 | 7/2018 |

OTHER PUBLICATIONS

"International Search Report and Written Opinion Issued in PCT Application No. PCT/US23/022440", Mailed Date: Aug. 2, 2023, 11 Pages.

* cited by examiner

*Primary Examiner* — Pierre E Elisca
(74) *Attorney, Agent, or Firm* — Rainier Patents, P.S.

(57) ABSTRACT

The description relates to input devices that can be secured to and used to control various devices. One example input device can include a housing defining a top surface that includes controls. The housing can define a recess that includes generally opposing upper and lower surfaces that extends at least partially under and parallel to the top surface. A self-adjusting gripping mechanism can extend into the recess through the lower surface and can be biased toward the upper surface. The self-adjusting gripping mechanism can be configured to be contacted by devices having a range of thicknesses and configured to grip individual devices within the range of thicknesses between the self-adjusting gripping mechanism and the upper surface.

20 Claims, 14 Drawing Sheets

ADAPTABLE INPUT DEVICES

BACKGROUND

Many computer users become accustomed to and prefer specific input devices, such as mice, roller balls, etc. This phenomenon is especially prevalent in video games. Video game platforms, such as Sony PlayStation and Microsoft Xbox, among others, include physical controllers to which users become very accustomed. Many of these users prefer to maintain a similar physical game controller across various gaming opportunities rather than adapting to different input devices on different devices.

SUMMARY

This patent relates to input devices that can be secured to and used to control various devices. One example input device can include a housing defining a top surface that includes controls. The housing can define a recess that includes generally opposing upper and lower surfaces that extends at least partially under and parallel to the top surface. A self-adjusting gripping mechanism can impinge on the recess (e.g., extend into the recess through the lower surface) and be biased toward the upper surface. The self-adjusting gripping mechanism can be configured to be contacted by devices having a range of thickness and configured to grip individual devices within the range of thicknesses between the self-adjusting gripping mechanism and the upper surface.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown.

DESCRIPTION

Figure 1A:
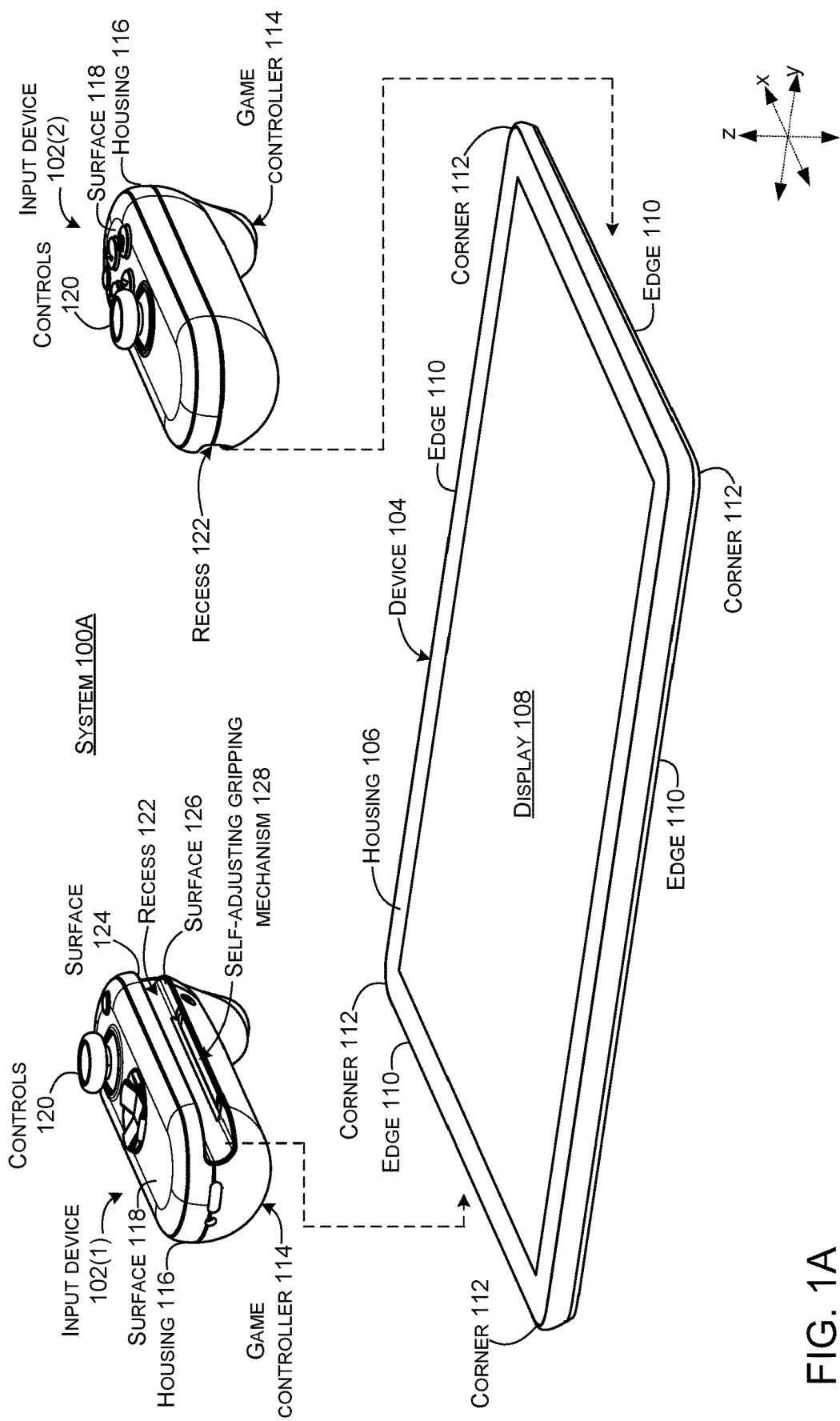
FIGS. 1A, 1B, 2A, 2B, 3A, 4A, and 5A show perspective views of example devices in accordance with some implementations of the present concepts.

The present concepts relate to input devices, such as game controllers that can be physically attached to, and removed from, various devices, such as tablets, phones, notebook computers, etc. The user can use the input devices to interact with content on the device, rather than relying on the device's native controls. The input devices can include self-adjusting gripping mechanisms that can be positioned on any edge of the device the user decides is preferable or desirable. Further, the self-adjusting gripping mechanisms can accommodate a variety of device thicknesses so the user can have confidence that whatever device they choose, phone, tablet, phone again, notebook, keyboard, etc., will be gripped and held by the self-adjusting gripping mechanisms so that the user can engage the input devices to control the device.

FIGS. 1A and 1B and 2A and 2B collectively show example systems 100A and 100B, respectively, that can include a pair of complementary input devices 102 that can grasp a device 104. In the illustrated positions the pair of input devices can be viewed as left and right complementary input devices, though they are not limited to those orientations.

In the case of system 100A the device 104 is manifest as a tablet. The device 104 can include a housing 106 and a display 108. The housing 106 can define edges 110 of the device that intersect at corners 112. The input devices 102 can be positioned at any location along the edges 110 as desired by a user for comfort and/or effectiveness. For instance, the input devices 102 can be positioned on an individual edge 110, at a corner 112, or between corners.

In this case, the input devices 102 are manifest as game controllers 114. The input devices 102 can include housings 116, surfaces 118, controls 120, and/or recesses 122. The recesses 122 can be defined at least in part by upper and lower surfaces 124 and 126. Self-adjusting gripping mechanisms 128 operate relative to the recesses 122 to grasp and hold the edges 110 of the device 102. The upper and lower surfaces 124 and 126 can be generally parallel to one another. For instance, generally parallel can mean that the upper and lower surfaces 124 and 126 are parallel to one another or within +/−20 degrees of being parallel.

In this case, the recesses 122 are linear to accept the linear edges 110 of the device 104. In other configurations, the recesses 122 can have a different shape, such as a non-linear shape that corresponds to a shape of the device. In this example, the game controllers 114 can have controls 120 that collectively mimic, or are similar to, traditional game controllers to which the user is accustomed.

Figure 1B:
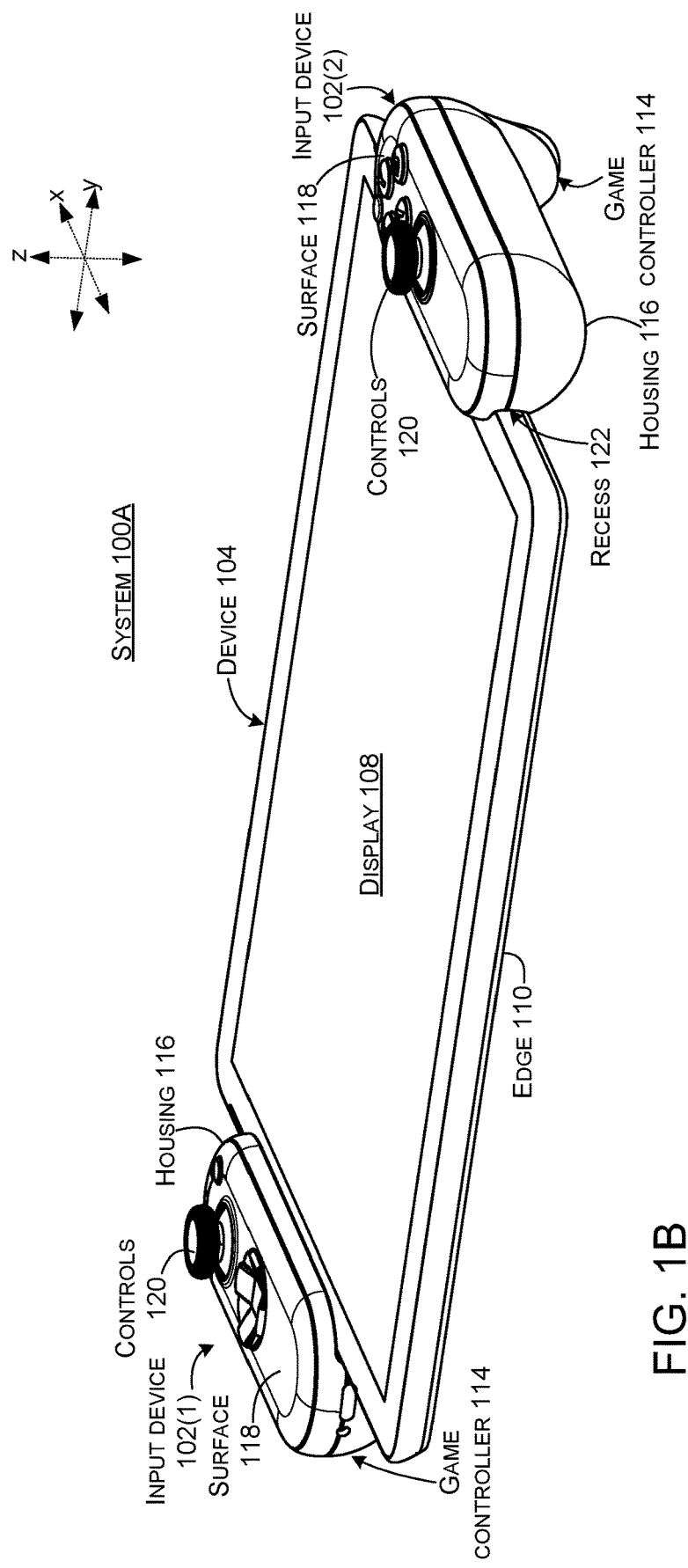

As mentioned above, the input devices 102 can accommodate many device form factors, such as the tablet shown in FIGS. 1A and 1B. Another example form factor is shown in FIGS. 2A and 2B.

Figure 2A:
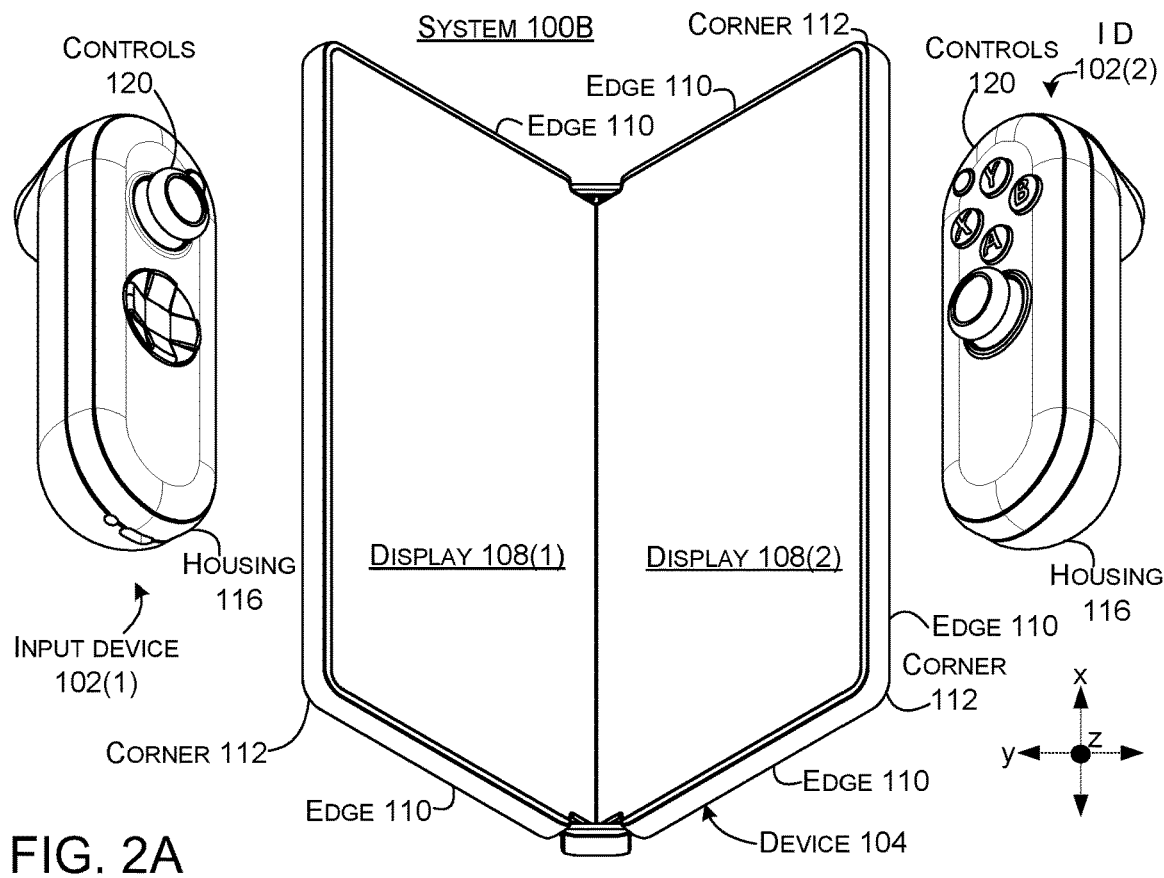
Figure 2B:
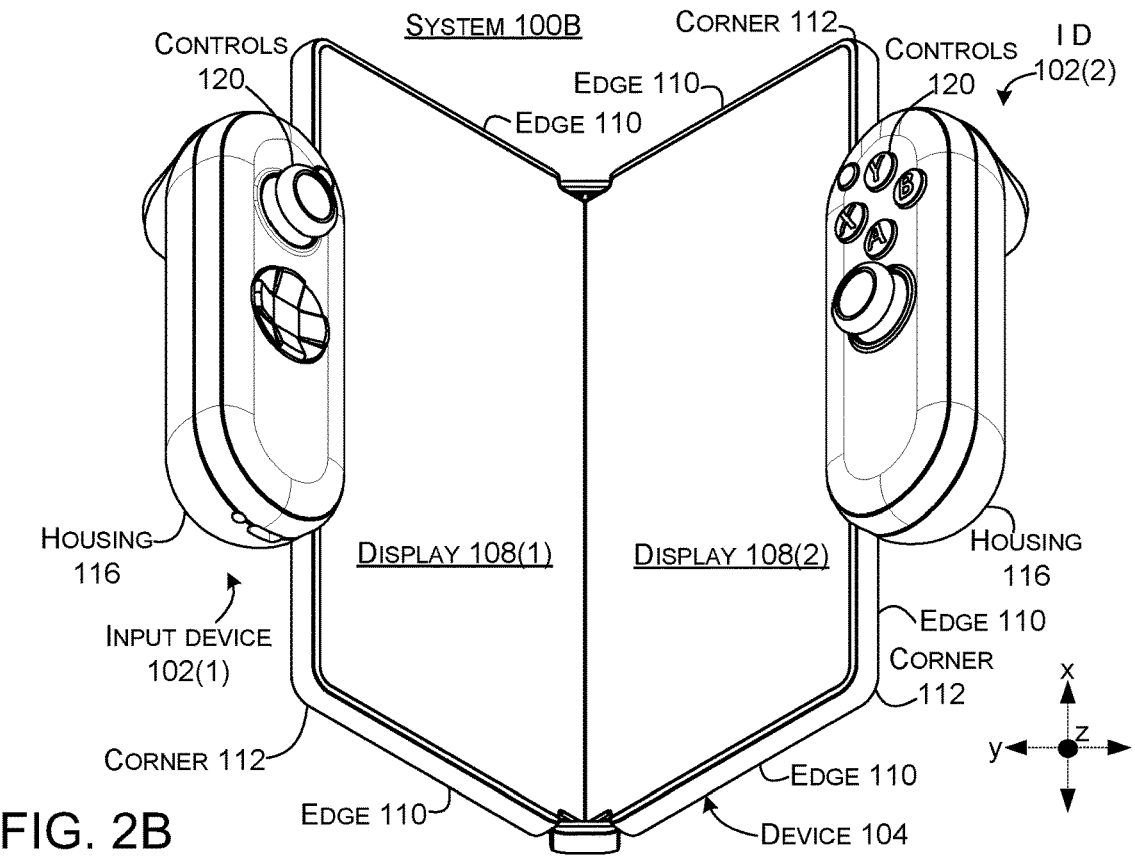

FIGS. 2A and 2B show system 100B. The use of the suffix "B" relative to system 100B is intended to indicate that this system may have different components and/or individual components may have differences from the systems described above and below. In this case, the device 104 is manifest as a hinged device, such as a folding phone that is likely thinner than larger devices. The input devices 102 can be readily attached to the two portions of the device and can function with the device 104 at a range of orientations of the device portions, such as from 90 degrees to 270 degrees, for example.

FIGS. 3A-3H collectively show another system 100C, which includes example input device 102(1). Though not shown, input device 102(1) may function in a 'pair' relationship with another input device, similar to FIGS. 1A and 1B and FIGS. 2A and 2B.

In this implementation of input device 102(1), the housing 116, surface 118, controls 120, recess 122, surface 124, and/or surface 126, are similar to the instances described above relative to FIGS. 1A-2B and are not reintroduced for sake of brevity. In this example, the self-adjusting gripping mechanism 128 includes an arm 302, contact member 304, and/or springs 306. The contact member 304 can be pivotably secured to the arm 302. The arm 302 and springs 306 can reside in a channel 308 that is defined between the housing 116 and a base 310. In this case, the channel 308 is arcuate to complement an arcuate shape of the arm 302. The arcuate shape of the arm 302 and the channel 308 are evidenced in FIGS. 3D-3H.

The springs 306 can be positioned between the housing 116 and the arm 302. The springs 306 can bias the arm 302 up through the lower surface 126 into the recess 122 and toward the upper surface 124. In this case, the springs 306 can create a radial bias on the arm 302. Other bias configurations are contemplated and examples are shown and discussed below relative to FIGS. 4A-4E and 5A-5G. In this case, the extent of the arm movement is controlled by inter-relationships of a tab 312 on the arm 302. The tab 312 travels within the bounds defined by a slot 314 formed in the housing 116 and thus the inter-relationship of the tab 312 and the slot 314 can define the extent of the arm movement.

The tab 312 also acts as an example of a user control element 313 that is configured to allow the user to adjust the position of the contact member in the recess 122. In this case, the user can move the tab 312 clockwise to allow the device to be positioned in the recess 122 and then move the tab 312 counter-clockwise to grasp the device in the recess.

Figure 3A:
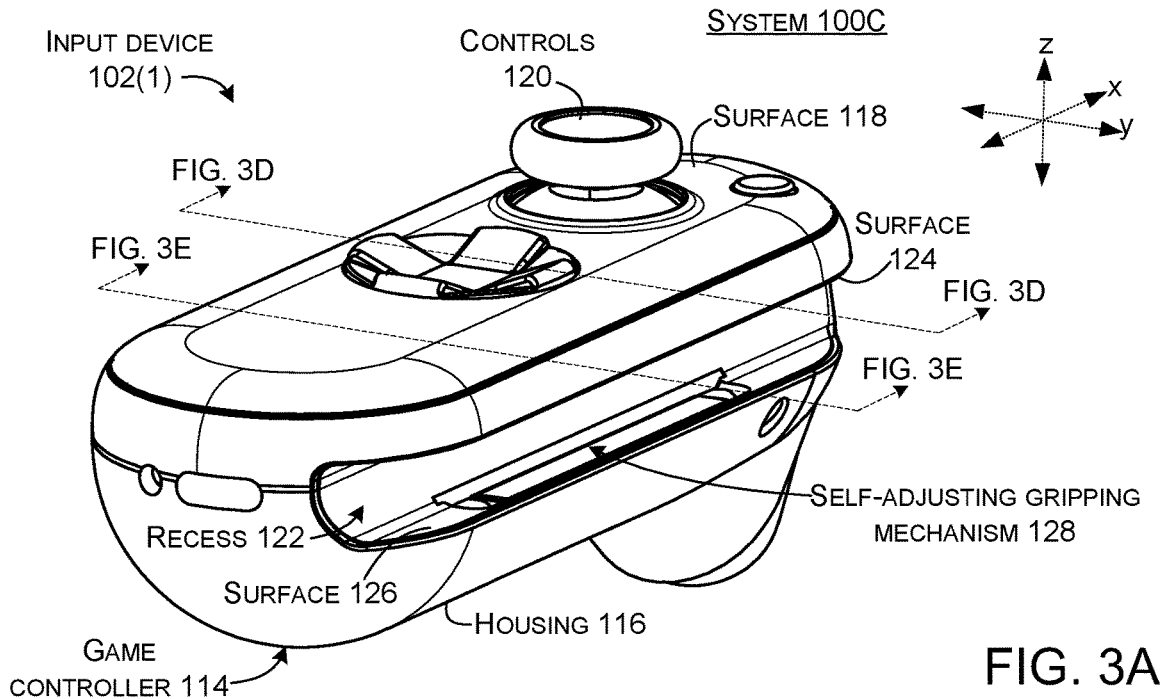
Figure 3B:
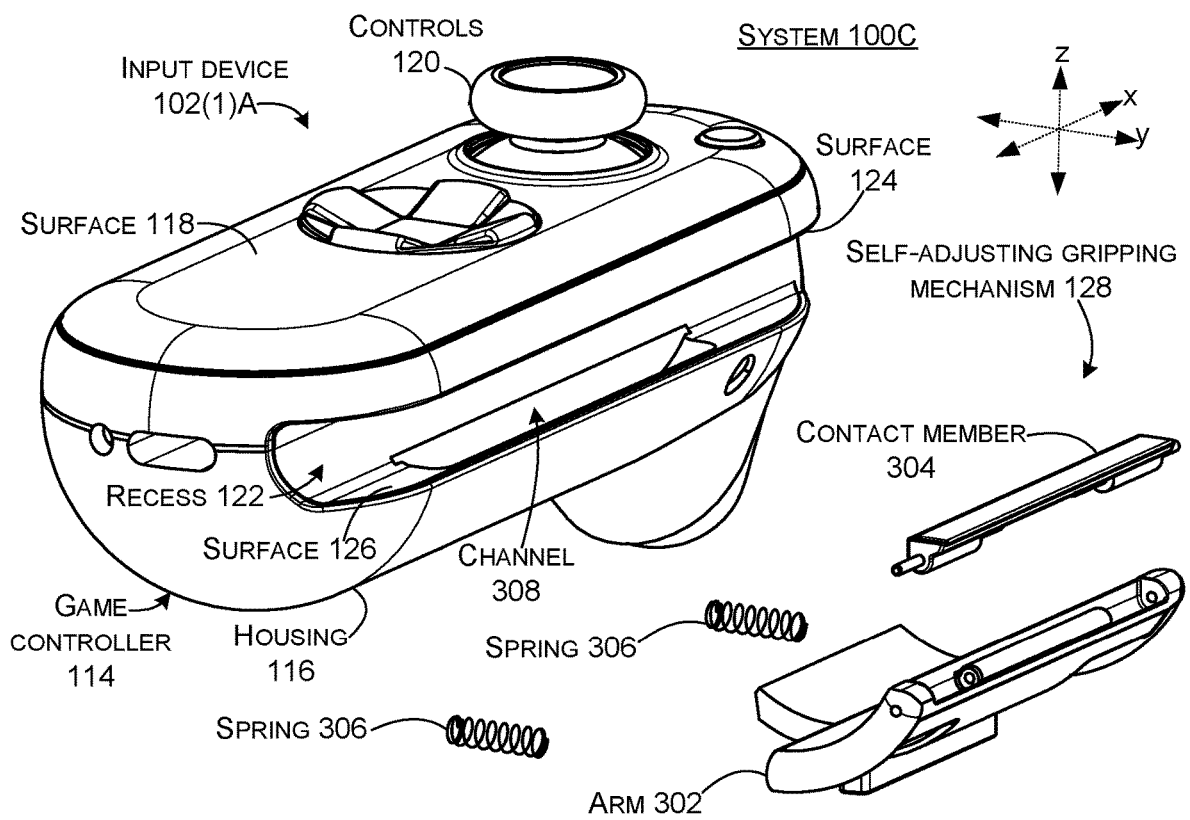
FIGS. 3B, 3C, 4B, and 5B show exploded perspective views of example devices in accordance with some implementations of the present concepts.
Figure 3C:
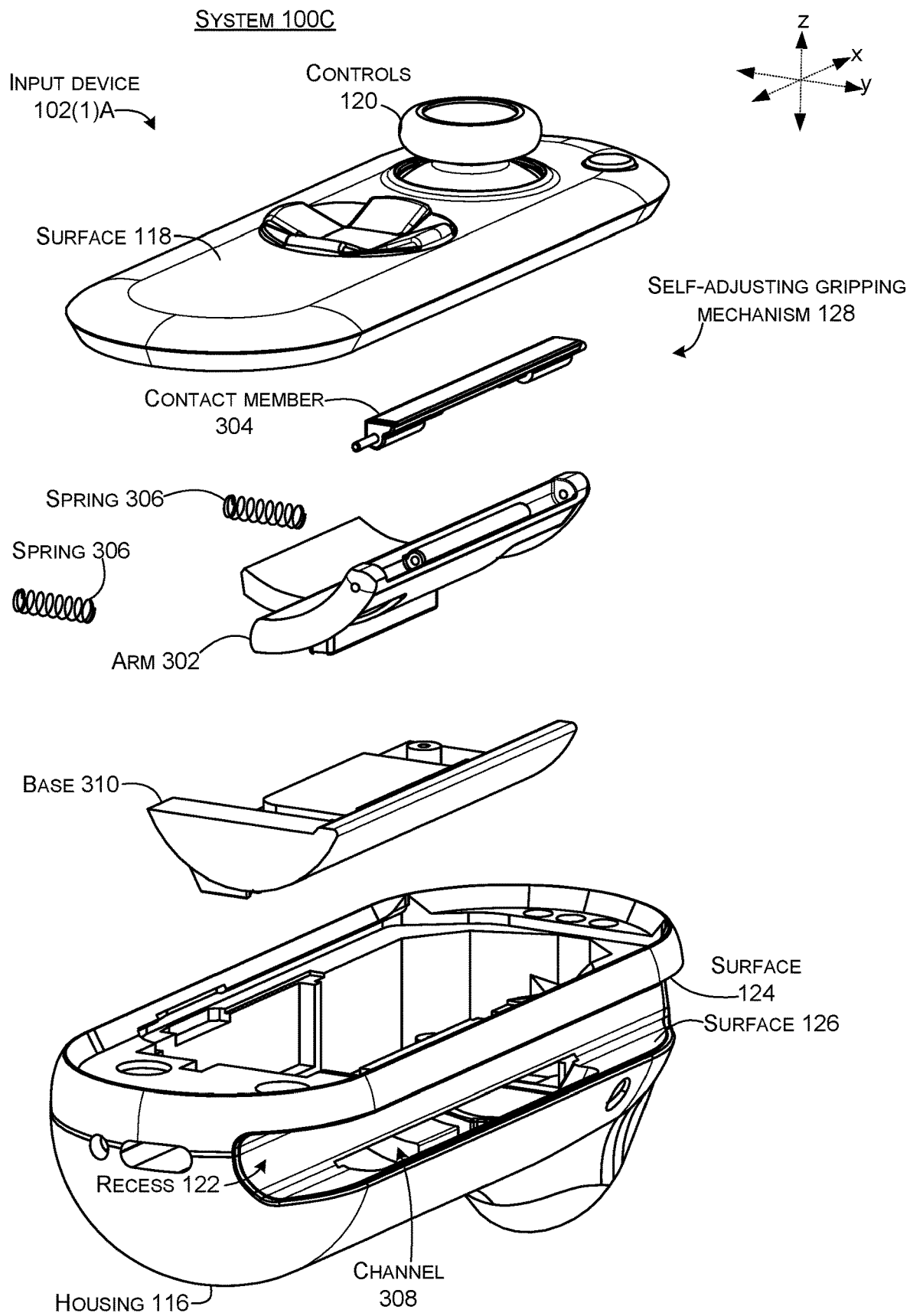
Figure 3D:
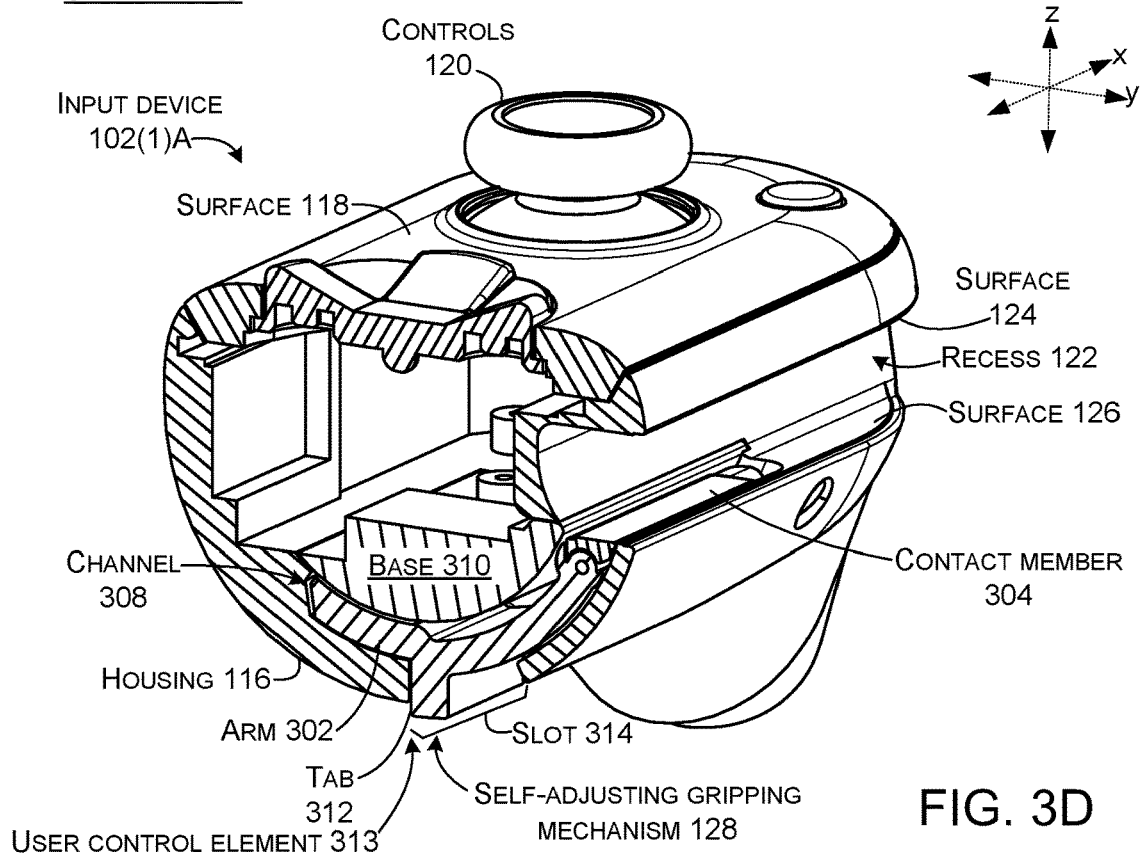
FIGS. 3D and 3E show sectioned perspective views of example devices in accordance with some implementations of the present concepts.
Figure 3E:
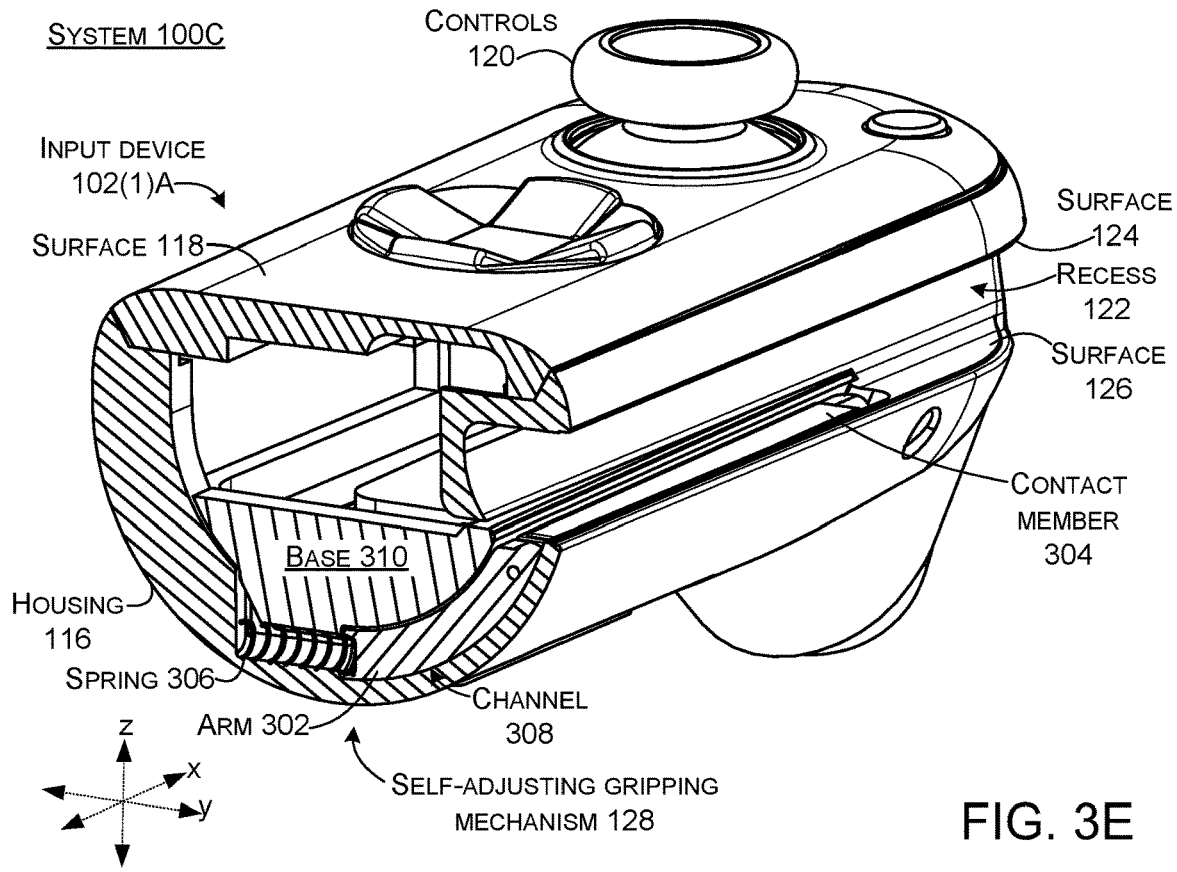
Figure 3F:
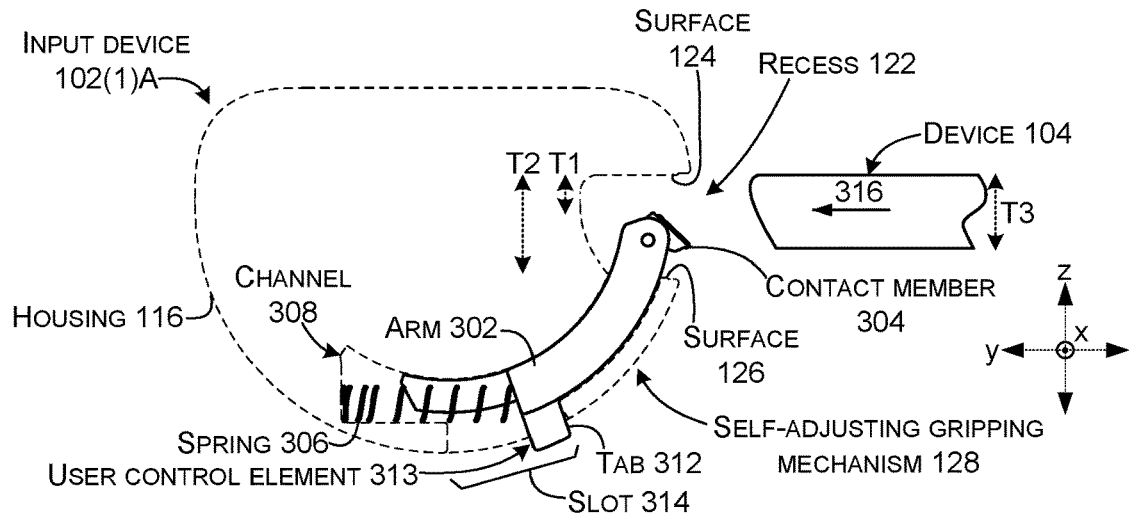
FIGS. 3F-3H, 4C-4E, and 5C-5G show elevational views of example devices in accordance with some implementations of the present concepts.
Figure 3G:
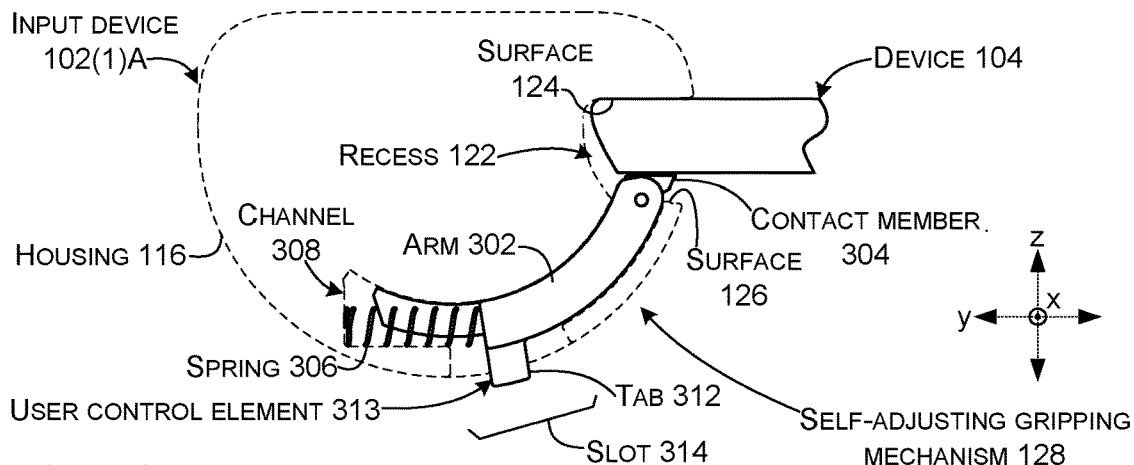
Figure 3H:
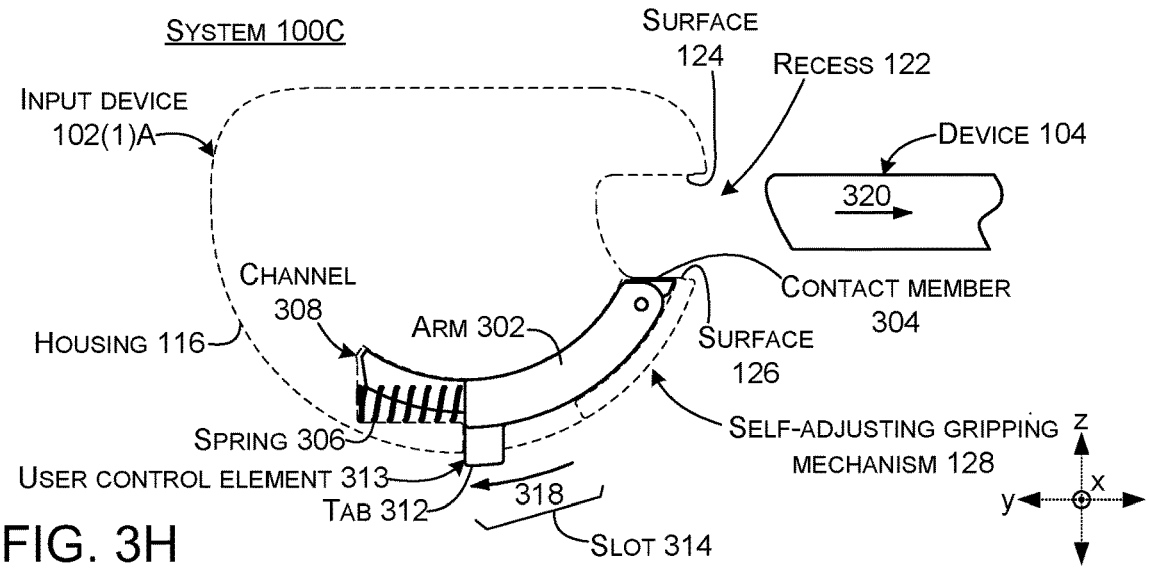

FIGS. 3F-3H show the functionality of the self-adjusting gripping mechanism 128 relative to example device 104, such as a smart phone or tablet, for example. FIG. 3F shows the self-adjusting gripping mechanism 128 in the resting state. The springs 306 are biasing the arm radially counter-clockwise into the recess 122. Further arm movement or rotation is stopped because tab 312 is contacting the edge of slot 314. In this example the contact between the tab 312 and the slot 314 occurs when the arm extends about halfway into the recess 122. Thus, the self-adjusting gripping mechanism 128 can automatically effectively grip devices in a range of thickness from thickness T1, which is slightly greater than a distance from upper surface 124 to the present location of the contact member 304 to a thickness T2, which is slightly less than a thickness of the recess 122 (e.g., slightly less than a distance between the upper surface 124 and the lower surface 126).

For purposes of explanation, an example device 104 that has a thickness T3 that is within the range of thicknesses is being moved toward the recess 122 as indicated by arrow 316 (and/or the input device 120A(1) is being moved toward the device 104). As the device 104 enters the recess 122, the leading edge of the device will engage the contact member 304 which is tipped (e.g., pivoted toward the device). Engagement of the device 104 on the contact member 304 will create a force on the contact member 304 and hence the arm 302. This force can overcome the bias on the arm 302 imparted by the spring 306 which can cause the arm 302 to move downward in the channel 308 and compress the spring 306. The contact member 304 can pivot with continued contact with the device 104 as the device moves into the recess 122.

Note also, that the tab 312 enables an alternative manner for installing the device 104 in the input device's self-adjusting gripping mechanism 128. The user can manually move the tab 312 clockwise in the slot 314. This action will lower the arm 302 and the contact member 304 in the recess 122 until the contact member contacts the lower surface 126 and/or the tab 312 contacts the opposite end of the slot 314. The user can then place the device 104 in the recess 122 and release the tab 312. Using this manual installation procedure allows the self-adjusting gripping mechanism to accommodate devices having thicknesses up to slightly less than a thickness of the recess 122. Thus, the tab 312 can function as a user control element 313 to allow the user to overcome and/or augment the bias created by the springs 306 in the recess 122.

FIG. 3G shows the self-adjusting gripping mechanism 128 in the gripping state. Lateral movement of the device 104 is stopped as the device contacts the back of the recess 122. The spring bias is pushing the arm 302 and contact member 304 upward against the device 104 and in turn the device moves upward until the device contacts the upper surface 124. The self-adjusting gripping mechanism 128 is now gripping the device between the contact member 304 and the upper surface 124 with bias supplied by springs 306. The contact member 304 and the upper surface 124 can include surface coatings or layers that have a relatively high coefficient of friction relative to common device materials, such as metal, glass, and/or plastic. Example coatings or layers can include rubber, silicone, thermoplastic elastomers (TPE), and/or polyvinyl chloride (PVC), among others. Alternatively or additionally to employing high friction materials on the contact member 304 and the upper surface 124, the geometry of the material can contribute to retaining the device. For instance, the contact member 304 and/or the upper surface 124 can entail multiple fibers (e.g., small 'fingers') that are angled toward the back of the recess 122. The fibers provide relatively little resistance when the device is inserted and relatively high resistance to removing the device.

FIG. 3H shows the self-adjusting gripping mechanism 128 in the release state. At this point the user has moved the tab 312 clockwise in the slot 314 as indicated by arrow 318. The movement of the tab 312 will compress the springs 306 and remove the bias imparted on the device by the self-adjusting gripping mechanism 128. The device 104 can be readily removed from the recess as indicated by arrow 320.

The self-adjusting gripping mechanism 128 can readily automatically grip and hold a variety of devices having a range of thicknesses, such as from 2 millimeters to 10 millimeters, for example in one configuration. The self-adjusting gripping mechanism 128 can accomplish the gripping on the edges of the device and does not require any specific placement in order to adequately hold the device.

FIGS. 4A-4E collectively show another system 100D, which includes example input devices 102(1) and 102(2) which can function cooperatively to provide a desired control configuration to allow the user to control content on example device 104. In this implementation, the housing 116, surface 118, controls 120, recess 122, surface 124, and/or surface 126, are similar to the instances described above relative to FIGS. 1A-2B and 3A-3H and are not re-introduced here for sake of brevity. In this example, the self-adjusting gripping mechanism 128 includes springs 402, frame 404, release 406, pins 408, shaft 410, cam rollers 412, cradle 414, and/or slots 416. The release 406 can function as an example user control element 313.

In this case, the cam rollers 412 are keyed on the shaft 410. Note that the shaft 410 is not centered in the cam rollers 412 and is instead offset (e.g., the cam rotates around an offset axis). The shaft 410 rests in cradle 414. The springs 402 include a hub and two arms (shown, but not designated with specificity). The hub is positioned on shaft 410. The arms are compressed between the cam rollers 412 and the housing 116 and create a rotational bias on the cam rollers 412. The pins 408 secure the release 406 to the frame 404. An exposed portion of the pins 408 can travel in slots 416 in the housing 116 during rotation of the frame 404 around the shaft 410. The cam rollers 412 and the upper surface 124 can be covered with relatively elastic materials that have a relatively high coefficient of friction relative to glass, metal, and plastic or other materials employed on the edges of devices, such as tablets and phones. Example materials are provided above. In one implementation, the cam rollers 412 and the upper surface 124 can be covered with neoprene or similar materials. Further, the surface of cam rollers 412 and the upper surface 124 can be relatively smooth or can be textured with features that increase surface contact with the device.

Figure 4A:
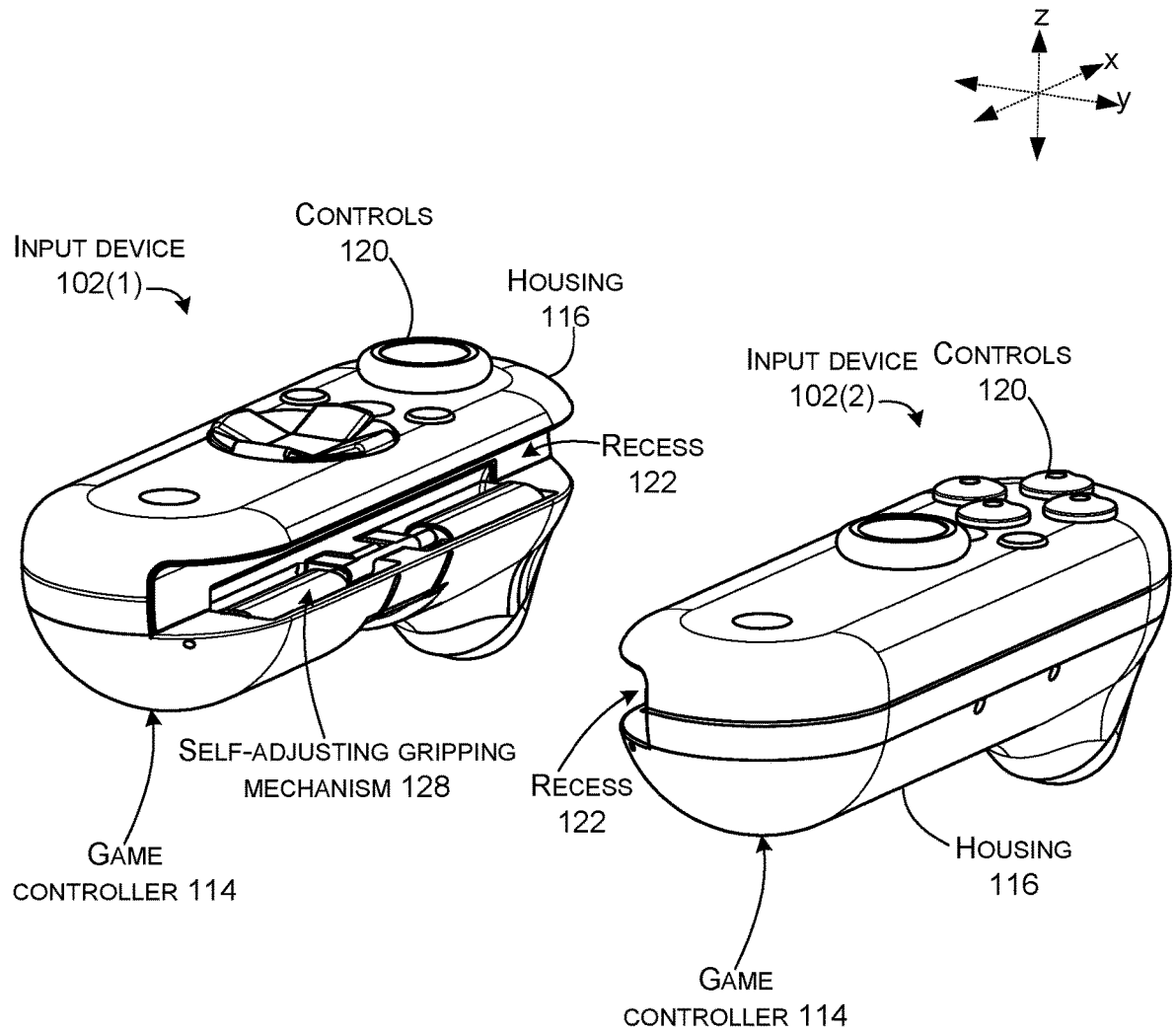
Figure 4B:
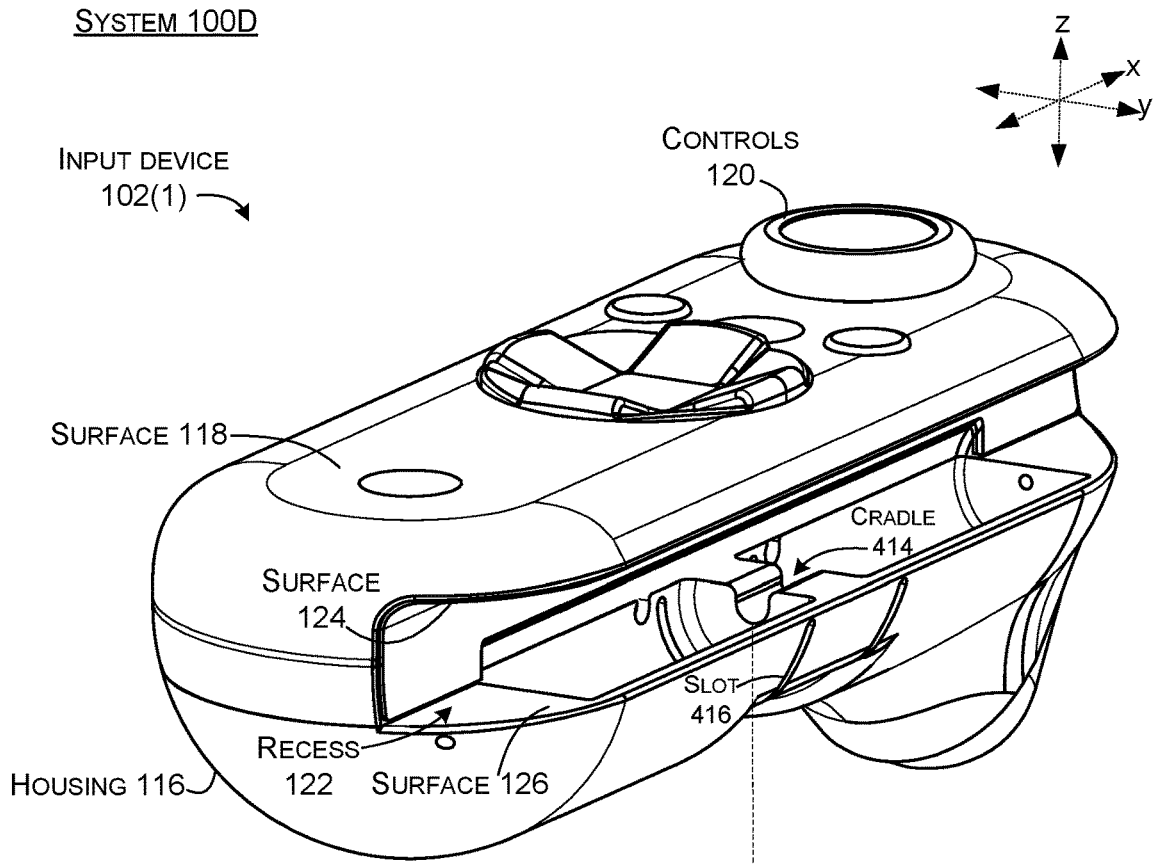
Figure 4B:
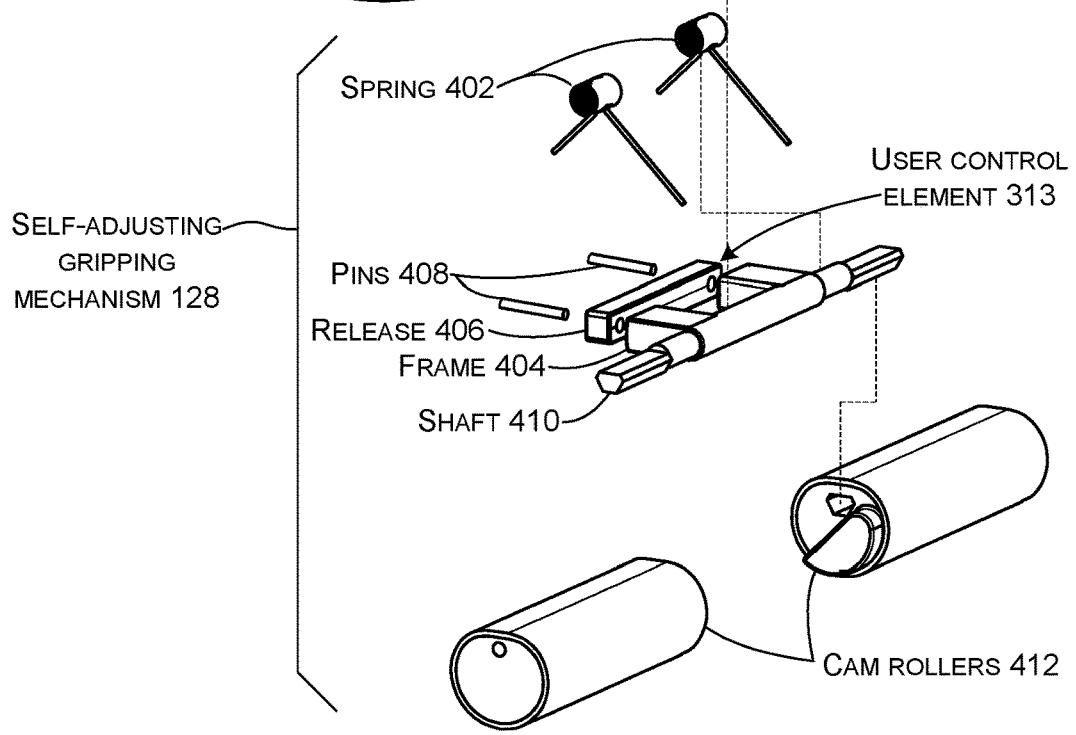
Figure 4C:
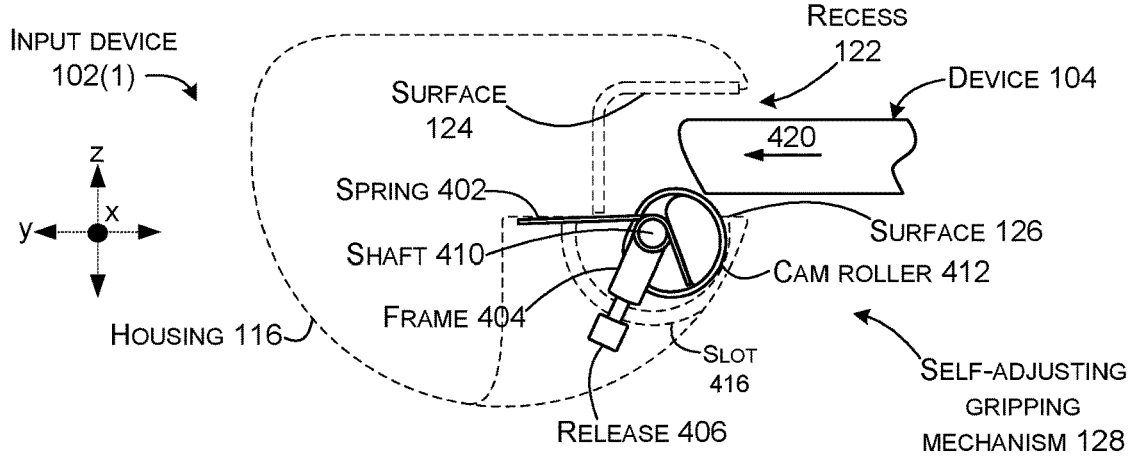
Figure 4D:
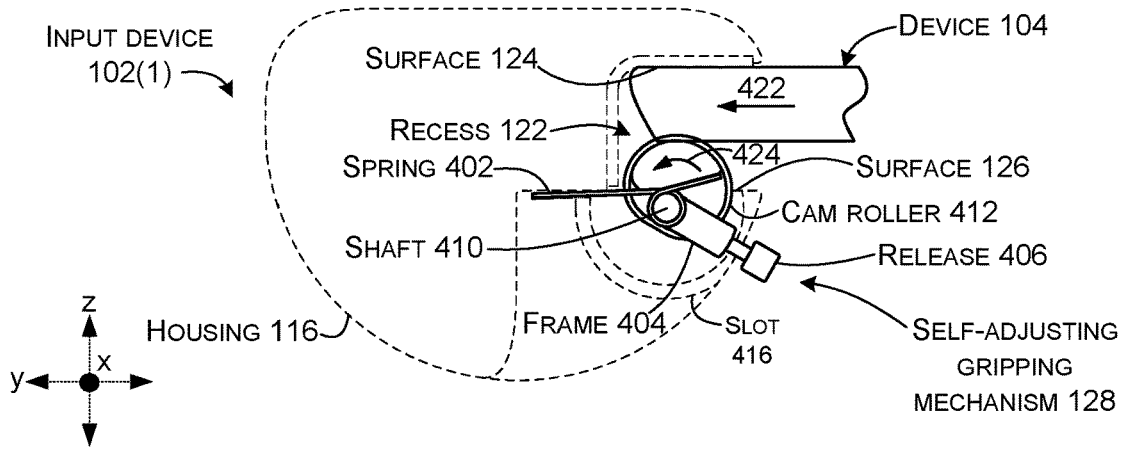
Figure 4E:
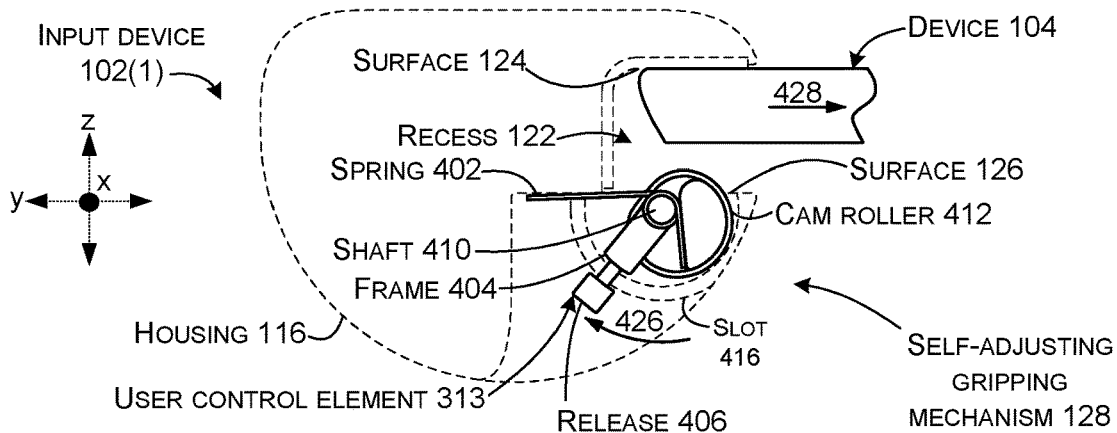

FIGS. 4C-4E show the functionality of the self-adjusting gripping mechanism 128 relative to an example device 104, such as a smart phone or tablet, for example.

FIG. 4C shows the self-adjusting gripping mechanism 128 in the resting state. At this point, the orientation of the cam roller 412 is influenced by the bias of the springs 402. The cam can be D-shaped or have another lift profile. At this point, the cam lift (e.g., the portion of the cam roller above the lower surface 126) is relatively small (e.g., the cam can be extending about 20% to 30% of the height of the recess 122 between the lower surface 126 and the upper surface 124). An example device 104 moving laterally (e.g., parallel to the y reference direction) into the recess 122 as indicated by arrow 420 can contact the cam roller 412.

FIG. 4D shows the device 104 in contact with the cam roller 412 and continuing to move laterally as indicated by arrow 422. This contact (and associated friction between the device 104 and the cam roller 412) causes the cam roller 412 to rotate (counter-clockwise in this example) as indicated by arrow 424. The rotation of the cam roller causes a portion of the cam roller 412, with more cam lift, to rotate above the lower surface 126 and 'lift' the device 104. As the rotation continues, the cam roller 412 eventually lifts the device 104 until the device is captured or squeezed between the cam roller 412 and the upper surface 124 of the recess 122. Thus, the self-adjusting gripping mechanism 128 provides a technical solution that converted the device's lateral motion into a vertical lift that grips and retains the device between the cam roller 412 and the upper surface 124 of the recess 122.

FIG. 4E shows the input device 102(1) in the release state where a user who wants to separate the input device 102(1) and the device 104 can move the release 406 clockwise as indicated by arrow 426 to rotate the cam roller 412 clockwise. Rotating the cam roller clockwise can decrease the cam lift and allow the user to move the device 104 laterally in an opposite direction as shown in FIG. 4C and as represented by arrow 428.

FIGS. 5A-5G collectively show another system 100E, which includes example input devices 102(1) and 102(2) which can function cooperatively to provide a desired control configuration to allow the user to control content on an example device 104. In this implementation, the housing 116, surface 118, controls 120, recess 122, surface 124, and/or surface 126, are similar to the instances described above and are not re-introduced here for sake of brevity. In this example, the self-adjusting gripping mechanism 128 includes a roller 502, ratchet gears 504, springs 506, pawls 508, a frame 510, and a release 512.

In this case, the ratchet gears 504 are coextensive with roller 502. The implementation of FIGS. 4A-4E employed a cam roller or cam shaped roller. In this implementation, the roller 502 can be cylindrical.

The ratchet gears 504 and roller 502 are rotatably secured to the frame 510. A fulcrum of the pawls 508 is rotatably secured to the frame 510 and the pawls are biased into the ratchet gears 504 by the springs 506. The pawls 508 interact with the ratchet gears 504 to allow the roller 502 to rotate in one direction, but block rotation in the opposite direction. The springs 506 are compressed between the housing 116 and the pawls 508. The release 512 is rotatably secured to the back side of the pawls 508 (e.g., at the opposite end from the ratchet gear engagement). The release 512 is configured to allow a user to selectively activate the release to disengage the pawls 508 from the ratchet gears 504. Releasing the pawls 508 from the ratchet gears 504 allows the roller 502 to rotate in either direction.

Figure 5A:
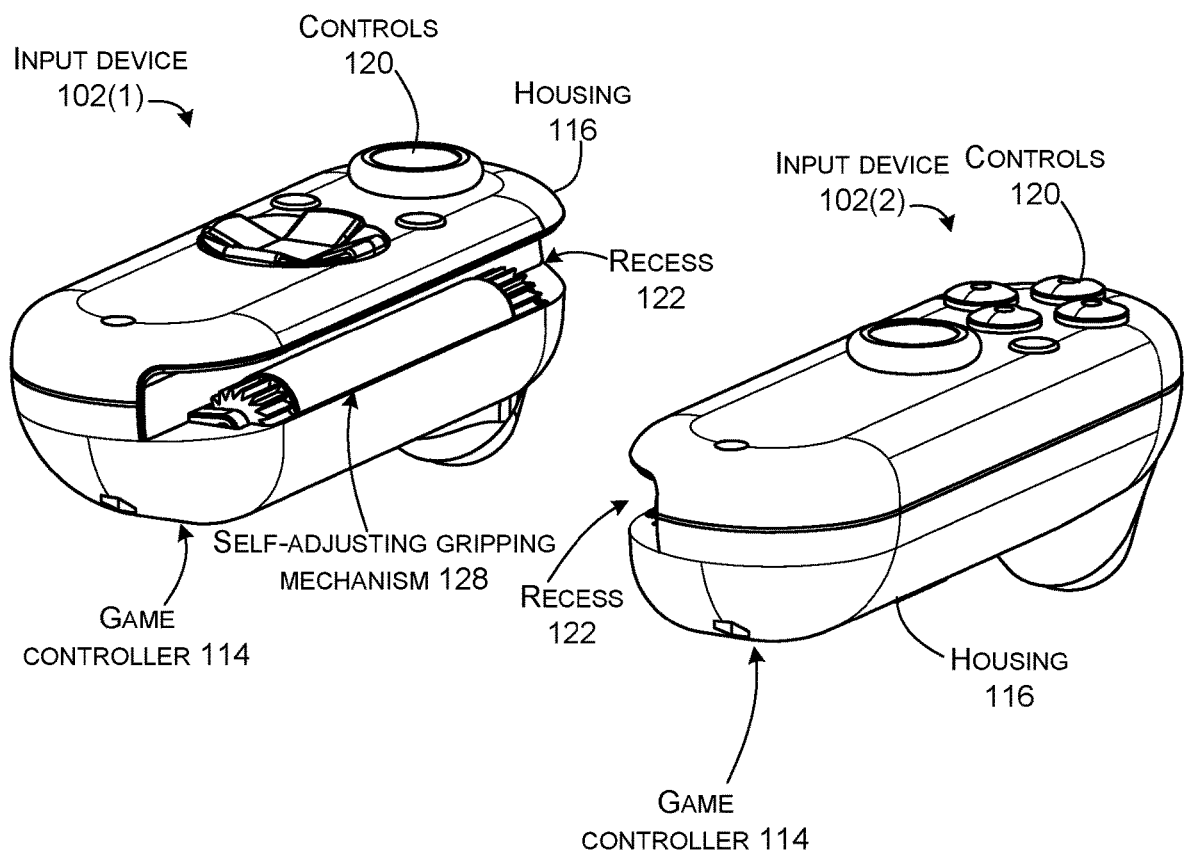
Figure 5B:
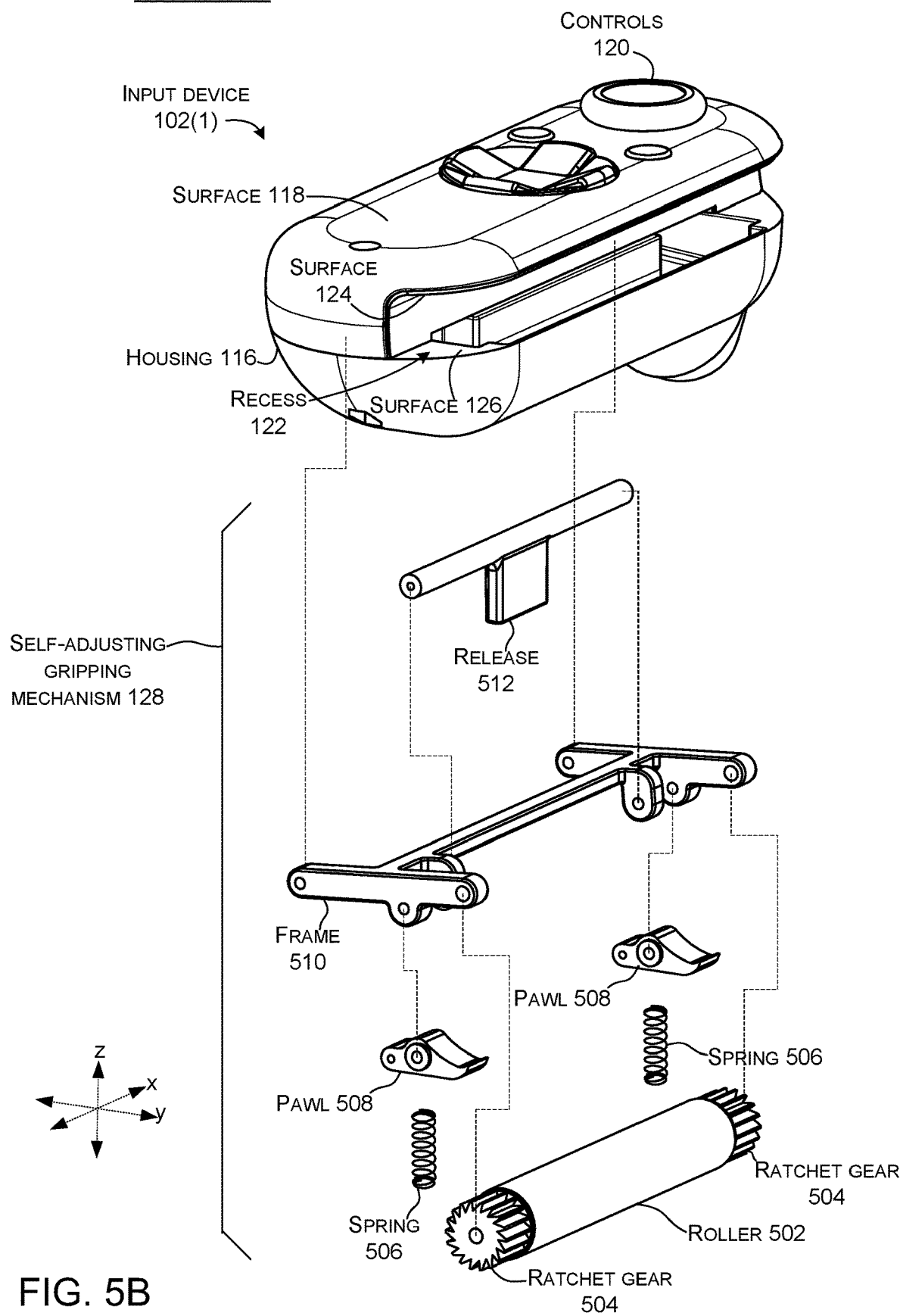
Figure 5C:
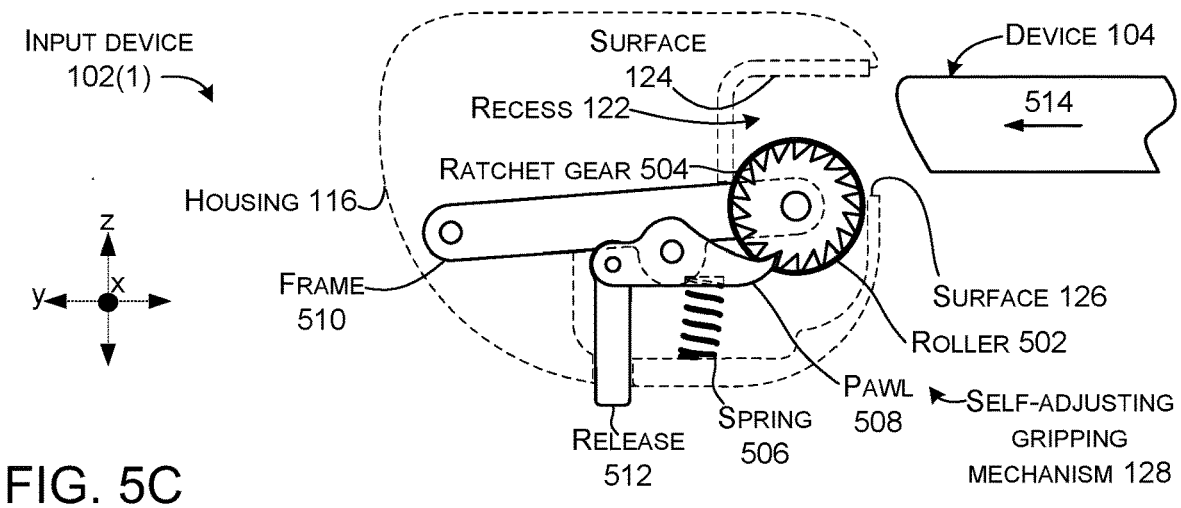

FIG. 5C shows the input device 102(1) in the resting configuration. At this point, the springs 506 are performing two functions. First, the springs 506 are biasing the pawls 508 upward into the teeth of the ratchet gear 504. This interaction of the pawls and the ratchet gear teeth blocks (e.g., limits) the ratchet gears and hence the rollers 502 from rotating clockwise while allowing the rollers to rotate in the other direction (in this case counter-clockwise). Second, the springs 506, by biasing the pawls 508 upward, are also biasing the frames 510 upward. The back end of the frames 510 can pivot in the housing 116 and thus the spring bias moves the front end of the frame and the roller 502 upward into the recess 122. For purposes of explanation, the 'front end' of the frame is the portion proximate to the recess 122. At this point, an example device having a thickness from about 50% to about 95% of the distance between the upper and lower surfaces 124 and 126 can be moved towards the recess 122 as indicated by arrow 514 to be gripped by the self-adjusting gripping mechanism 128. The thicknesses were labelled relative to FIG. 3F and are not relabeled here to avoid clutter on the drawing page.

Figure 5D:
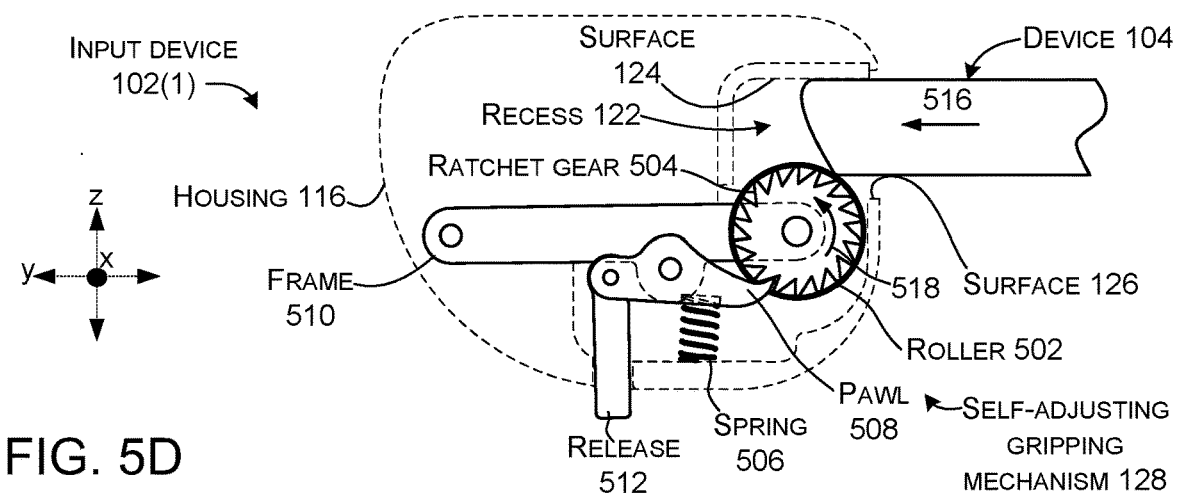

FIG. 5D shows the device 104 continuing to move laterally as shown by arrow 516 and beginning to engage the roller 502. The lateral movement of the device 104 while engaging the roller 502 will cause the roller to rotate counter-clockwise as shown by arrow 518. Responsively, the roller 502 will lift the device 104 vertically (in the z reference direction) until the device reaches the straight up (12 o'clock position) and/or the device contacts the upper surface 124, which is shown in FIG. 5E.

Figure 5E:
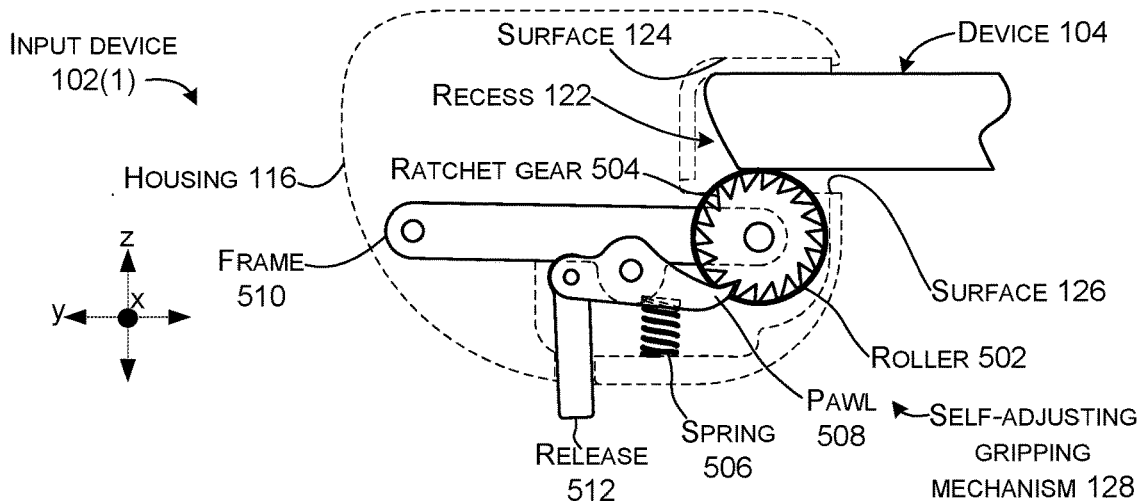

FIG. 5E shows the device 104 fully inserted in the recess 122. The device is being grasped between the roller 502 and the upper surface 124. The thickness of the device 104 has partially overcome the force of the spring 506 biasing the roller upward and instead forced the roller downward, which is evidenced in the change of posture of the frame 510 from FIG. 5D to FIG. 5E. At this point, the upward bias of the springs 506 on the roller 502 grips the device 104 between the roller and the upper surface 124 of the recess 122. The grip can be enhanced by high friction surfaces on the roller and the upper surface as described above relative to FIGS. 4A-4C. The pawl 508 is engaged in the teeth of the ratchet gear 504 so the self-adjusting gripping mechanism 128 is also locking the device 104 in its grasp because the roller is blocked from rotating clockwise. Thus, the self-adjusting gripping mechanism provides two technical solutions of grasping the device 104 with the roller 502 and spring pressure and locking the roller 502 with the ratchet gear 504 and the pawl 508 to provide enhanced retention of the device 104 in the recess 122.

Figure 5F:
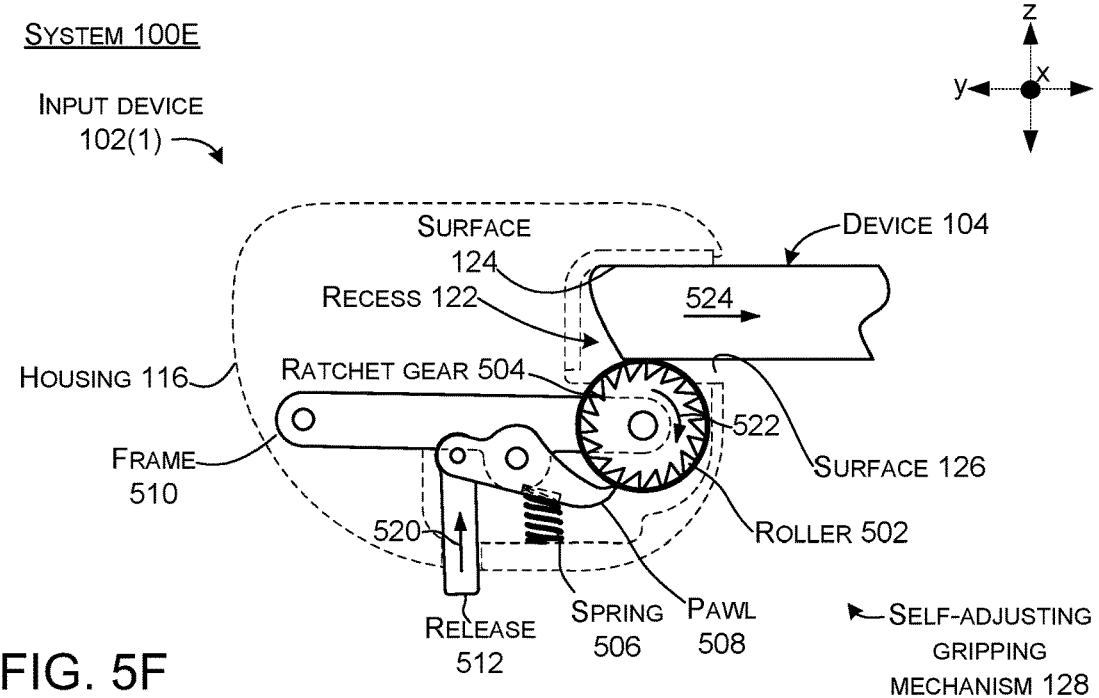

FIG. 5F shows a subsequent point where the user wants to separate the input device 102(1) and the device 104. Toward this end, the user can activate the release 512. In this implementation the user can activate the release 512 by pushing the release up (in the z reference direction) as indicated by arrow 520. Pushing up on the release 512 causes the front of the pawl 508 to pivot downward and compress the spring 506. When the pawl pivots downward it disengages from the teeth of the ratchet gear 504. With the release of the ratchet gear, the roller 502 is free to turn in the clockwise direction as indicated by arrow 522 when the user moves the device 104 laterally out of the recess 122 as indicated by arrow 524.

Figure 5G:
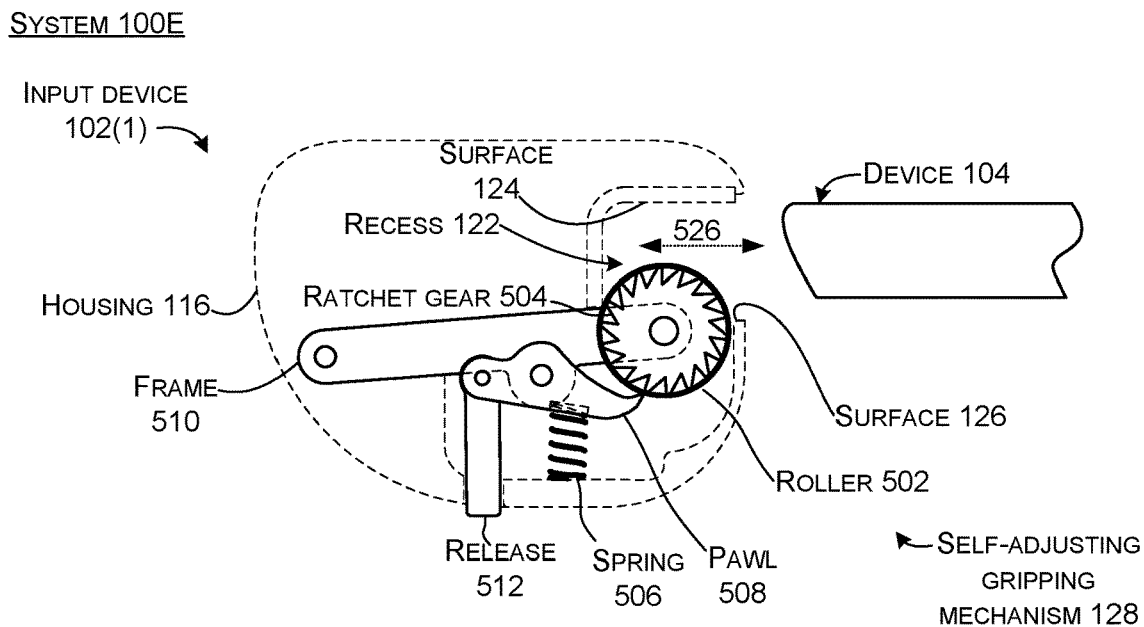

FIG. 5G show the device 104 and the input device 102(1) separated from one another by relative lateral movement represented by arrow 526. At this point, the release 512 is still activated so the pawl is still disengaged from the teeth of the ratchet gear 504 and the roller 502 can rotate in either direction. The device 104 is no longer in the recess 122 so the spring 506 has biased the roller 502 farther up into the recess 122 compared to FIG. 5F. When the user lets go of the release 512, the self-adjusting gripping mechanism 128 and the input device 102(1) can return to the resting state of FIG. 5C.

In this implementation, the self-adjusting gripping mechanism 128 can both apply a retention force (e.g., grip the device between the roller 502 and the upper surface 124) and lock the roller to prevent the device from 'rolling' out of the recess 122.

Several example self-adjusting gripping mechanisms 128 are described above that can allow one or a pair of input devices to readily and effectively grip an edge of a device so that the input devices can be engaged by the user in a comfortable manner to control content on the device. The input devices can be just as readily separated from the device when the user is finished. The self-adjusting gripping mechanism 128 can operate relative to a recess defined in the input device and can grip any device that will fit in the recess. The self-adjusting gripping mechanism 128 can accomplish this technical functionality by gripping an edge of the device 104. The self-adjusting gripping mechanism 128 does not rely on wrapping around corners (e.g., engaging corners) of the device or elements that span across the back of the device to physically connect the input devices to one another. Instead, each input device can employ a self-adjusting gripping mechanism that can grip any edge of the device for a placement desired by the user.

In the gaming realm, the present concepts can allow the user to easily and effectively temporarily secure input devices that have a favored feel and/or layout to a device to control content on the device. This association of the game controllers to the device enables more effective gameplay on a wide range of devices than the user trying to adapt to the controls available on the device. The self-adjusting gripping mechanism can be configured to grip devices of varying thicknesses via the insertion pressure, using, for instance as explained above, a ratcheting cam on a pivot arm, for instance. This self-adjusting gripping mechanism can use the mass of the device, along with the designed shape of the cam and static friction of the surfaces in contact with the device to hold it. Releasing the device can be achieved by unlocking the ratchet on the cam rotation axis to allow the device to be withdrawn from the input device.

Individual input device elements can be made from various materials, such as metals, plastics, rubber, glass, and/or composites. These materials can be prepared in various ways, such as from formed sheet metals, die cast metals, machined metals, 3D printed materials, molded or 3D printed plastics, and/or molded or 3D printed composites, among others, and/or any combination of these materials and/or preparations can be employed.

The present self-adjusting gripping mechanism concepts can be utilized with various input devices in concert with any type of device, such as but not limited to notebook computers, smart phones, wearable smart devices, tablets, keyboards, and/or other types of existing, developing, and/or yet to be developed devices.

Various methods of manufacture, assembly, and/or use for self-adjusting gripping mechanisms and input devices are contemplated beyond those shown above relative to FIGS. 1A-5G.

Various examples are described above. Additional examples are described below. One example includes a system comprising a pair of complementary left and right game controllers, the left game controller comprising a first housing defining a first recess on a right side of the first housing and first controls positioned on a top surface of the first housing, the left game controller further comprising a first self-adjusting gripping mechanism configured to impinge on the first recess and force a device positioned in the first recess toward the first controls and to grasp the device between the first self-adjusting gripping mechanism and the first housing and the right game controller comprising a second housing defining a second recess on a left side of the second housing and second controls positioned on a top surface of the second housing, the right game controller further comprising a second self-adjusting gripping mechanism configured to impinge on the second recess and force the device positioned in the second recess toward the second controls and to grasp the device between the second self-adjusting gripping mechanism and the second housing.

Another example can include any of the above and/or below examples where the first self-adjusting gripping mechanism is configured to grasp any device having a thickness that will fit in the first recess and wherein the second self-adjusting gripping mechanism is configured to grasp any device having a thickness that will fit in the second recess.

Another example can include any of the above and/or below examples where the first self-adjusting gripping mechanism comprises a first arm that is radially biased through a lower surface of the first recess toward an upper surface of the first recess and wherein the second self-adjusting gripping mechanism comprises a second arm that is radially biased through a lower surface of the second recess toward an upper surface of the second recess.

Another example can include any of the above and/or below examples where the first self-adjusting gripping mechanism further comprises a first spring that is compressed between the first housing and the first arm to bias the first arm through the lower surface of the first recess and the second self-adjusting gripping mechanism comprises a second spring that is compressed between the second housing and the second arm to bias the second arm through the lower surface of the second recess.

Another example can include any of the above and/or below examples where the first self-adjusting gripping mechanism further comprises a first contact member positioned on the first arm and including a first high friction surface configured to contact and grasp the device and wherein the second self-adjusting gripping mechanism further comprises a second contact member positioned on the second arm and including a second high friction surface configured to contact and grasp the device.

Another example can include any of the above and/or below examples where the first contact member is pivotably positioned on the first arm and the second contact member is pivotably positioned on the second arm.

Another example can include any of the above and/or below examples where the first self-adjusting gripping mechanism comprises a first cam roller that is biased through a lower surface of the first recess toward an upper surface of the first recess and wherein the second self-adjusting gripping mechanism comprises a second cam roller that is biased through a lower surface of the second recess toward an upper surface of the second recess.

Another example can include any of the above and/or below examples where the first cam roller is D-shaped and is configured to rotate around an offset axis and wherein the second cam roller is D-shaped and is configured to rotate around the offset axis.

Another example can include any of the above and/or below examples where the first self-adjusting gripping mechanism comprises a first roller that is coextensive with a first ratchet gear and wherein the second self-adjusting gripping mechanism comprises a second roller that is coextensive with a second ratchet gear.

Another example can include any of the above and/or below examples where the first self-adjusting gripping mechanism comprises a first pawl that is configured to engage the first ratchet gear and wherein the second self-adjusting gripping mechanism comprises a second pawl that is configured to engage the second ratchet gear.

Another example can include any of the above and/or below examples where the first pawl is configured to allow the first ratchet gear to allow the first roller to roll as a device is inserted into the first recess but does not allow the first roller to roll in an opposite direction that would allow the device to withdraw from the first recess, and wherein the second pawl is configured to allow the second ratchet gear to allow the second roller to roll as a device is inserted into the second recess but does not allow the second roller to roll in an opposite direction that would allow the device to withdraw from the second recess.

Another example can include any of the above and/or below examples where the first self-adjusting gripping mechanism further comprises a user control element that is configured to allow the user to manually adjust the position of the first self-adjusting gripping mechanism in the first recess, and wherein the second self-adjusting gripping mechanism further comprises another user control element that is configured to allow the user to manually adjust the position of the second self-adjusting gripping mechanism in the second recess.

Another example includes an input device comprising a housing defining a top surface that includes controls, the housing defining a recess that includes generally opposing upper and lower surfaces that extends at least partially under and parallel to the top surface, and a self-adjusting gripping mechanism extending into the recess through the lower surface and biased toward the upper surface, the self-adjusting gripping mechanism configured to be contacted by devices having a range of thicknesses and configured to grip individual devices within the range of thicknesses between the self-adjusting gripping mechanism and the upper surface.

Another example can include any of the above and/or below examples where the self-adjusting gripping mechanism comprises a roller that is biased into the recess by a spring.

Another example can include any of the above and/or below examples where the roller is cylindrical or wherein the roller is cam shaped.

Another example can include any of the above and/or below examples where the self-adjusting gripping mechanism further comprises an element that limits a direction of rotation of the roller.

Another example can include any of the above and/or below examples where the element comprises a ratchet gear that is coextensive with the roller and a pawl that engages the ratchet gear.

Another example can include any of the above and/or below examples where a release is configured to be activated by a user to disengage the pawl from the ratchet gear to allow rotation of the roller.

Another example includes a system comprising a first game controller having a first housing defining a first linear recess and a first self-adjusting gripping mechanism configured to engage a first edge of a device inserted into the first linear recess and a second game controller having a second housing defining a second linear recess and a second self-adjusting gripping mechanism configured to engage a second edge of a device inserted into the second linear recess.

Another example can include any of the above and/or below examples where the first game controller is not physically connected to the second game controller.

Another example can include any of the above and/or below examples where the first game controller and the second game controller are configured to engage the first edge and the second edge to grasp the device and do not rely on engaging corners of the device to grasp the device.

Although techniques, methods, devices, systems, etc., pertaining to self-adjusting gripping mechanisms are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A system, comprising:
a pair of complementary left and right game controllers;
the left game controller comprising a first housing defining a first recess on a right side of the first housing and first controls positioned on a top surface of the first housing, the left game controller further comprising a first self-adjusting gripping mechanism configured to impinge on the first recess and force a device positioned in the first recess toward the first controls and to grasp the device between the first self-adjusting gripping mechanism and the first housing; and,
the right game controller comprising a second housing defining a second recess on a left side of the second housing and second controls positioned on a top surface of the second housing, the right game controller further comprising a second self-adjusting gripping mechanism configured to impinge on the second recess and force the device positioned in the second recess toward the second controls and to grasp the device between the second self-adjusting gripping mechanism and the second housing.

2. The device of claim 1, wherein the first self-adjusting gripping mechanism is configured to grasp any device having a thickness that will fit in the first recess and wherein the second self-adjusting gripping mechanism is configured to grasp any device having a thickness that will fit in the second recess.

3. The device of claim 2, wherein the first self-adjusting gripping mechanism comprises a first arm that is radially biased through a lower surface of the first recess toward an upper surface of the first recess and wherein the second self-adjusting gripping mechanism comprises a second arm that is radially biased through a lower surface of the second recess toward an upper surface of the second recess.

4. The device of claim 3, wherein the first self-adjusting gripping mechanism further comprises a first spring that is compressed between the first housing and the first arm to bias the first arm through the lower surface of the first recess and the second self-adjusting gripping mechanism comprises a second spring that is compressed between the second housing and the second arm to bias the second arm through the lower surface of the second recess.

5. The device of claim 4, wherein the first self-adjusting gripping mechanism further comprises a first contact member positioned on the first arm and including a first high friction surface configured to contact and grasp the device and wherein the second self-adjusting gripping mechanism further comprises a second contact member positioned on the second arm and including a second high friction surface configured to contact and grasp the device.

6. The device of claim 5, wherein the first contact member is pivotably positioned on the first arm and the second contact member is pivotably positioned on the second arm.

7. The device of claim 2, wherein the first self-adjusting gripping mechanism comprises a first cam roller that is biased through a lower surface of the first recess toward an upper surface of the first recess and wherein the second self-adjusting gripping mechanism comprises a second cam roller that is biased through a lower surface of the second recess toward an upper surface of the second recess.

8. The device of claim 7, wherein the first cam roller is D-shaped and is configured to rotate around an offset axis and wherein the second cam roller is D-shaped and is configured to rotate around the offset axis.

9. The device of claim 2, wherein the first self-adjusting gripping mechanism comprises a first roller that is coextensive with a first ratchet gear and wherein the second self-adjusting gripping mechanism comprises a second roller that is coextensive with a second ratchet gear.

10. The device of claim 9, wherein the first self-adjusting gripping mechanism comprises a first pawl that is configured to engage the first ratchet gear and wherein the second self-adjusting gripping mechanism comprises a second pawl that is configured to engage the second ratchet gear.

11. The device of claim 10, wherein the first pawl is configured to allow the first ratchet gear to allow the first roller to roll as a device is inserted into the first recess but does not allow the first roller to roll in an opposite direction that would allow the device to withdraw from the first recess, and wherein the second pawl is configured to allow the second ratchet gear to allow the second roller to roll as a device is inserted into the second recess but does not allow the second roller to roll in an opposite direction that would allow the device to withdraw from the second recess.

12. The device of claim 1, wherein the first self-adjusting gripping mechanism further comprises a user control element that is configured to allow the user to manually adjust the position of the first self-adjusting gripping mechanism in the first recess, and wherein the second self-adjusting gripping mechanism further comprises another user control element that is configured to allow the user to manually adjust the position of the second self-adjusting gripping mechanism in the second recess.

13. An input device, comprising:
a housing defining a top surface that includes controls, the housing defining a recess that includes generally opposing upper and lower surfaces that extends at least partially under and parallel to the top surface; and,
a self-adjusting gripping mechanism extending into the recess through the lower surface and biased toward the upper surface, the self-adjusting gripping mechanism configured to be contacted by devices having a range of thicknesses and configured to grip individual devices within the range of thicknesses between the self-adjusting gripping mechanism and the upper surface.

14. The input device of claim 13, wherein the self-adjusting gripping mechanism comprises a roller that is biased into the recess by a spring.

15. The input device of claim 14, wherein the roller is cylindrical or wherein the roller is cam shaped.

16. The input device of claim 14, wherein the self-adjusting gripping mechanism further comprises an element that limits a direction of rotation of the roller.

17. The input device of claim 16, wherein the element comprises a ratchet gear that is coextensive with the roller and a pawl that engages the ratchet gear.

18. The input device of claim 17, further comprising a release that is configured to be activated by a user to disengage the pawl from the ratchet gear to allow rotation of the roller.

19. A system, comprising:
a first game controller having a first housing defining a first linear recess and a first self-adjusting gripping mechanism configured to engage a first edge of a device inserted into the first linear recess; and,
a second game controller having a second housing defining a second linear recess and a second self-adjusting gripping mechanism configured to engage a second edge of a device inserted into the second linear recess.

20. The system of claim 19, wherein the first game controller is not physically connected to the second game controller.

* * * * *